United States Patent [19]

Su

[11] Patent Number: 4,559,059
[45] Date of Patent: * Dec. 17, 1985

[54] TINTED CONTACT LENSES AND A METHOD FOR THEIR PREPARATION

[75] Inventor: Kai C. Su, Roswell, Ga.

[73] Assignee: Ciba-Geigy Corporation, Ardsley, N.Y.

[*] Notice: The portion of the term of this patent subsequent to Aug. 28, 2001 has been disclaimed.

[21] Appl. No.: 642,460

[22] Filed: Aug. 20, 1984

Related U.S. Application Data

[63] Continuation of Ser. No. 580,398, Feb. 15, 1984, which is a continuation-in-part of Ser. No. 382,973, Jun. 1, 1982, Pat. No. 4,468,229, which is a continuation-in-part of Ser. No. 292,325, Aug. 12, 1981, abandoned.

[51] Int. Cl.$^4$ ............................................... D06P 5/00
[52] U.S. Cl. .......................................... 9/507; 8/549; 8/543; 351/162; 427/164
[58] Field of Search ...................................... 8/507, 549

[56] References Cited

U.S. PATENT DOCUMENTS

| | | | |
|---|---|---|---|
| 4,252,421 | 2/1981 | Foley | 351/162 |
| 4,447,474 | 5/1984 | Neefe | 8/507 |
| 4,468,229 | 8/1984 | Su | 8/507 |
| 4,494,954 | 1/1985 | Suminde et al. | 8/507 |

FOREIGN PATENT DOCUMENTS 1004424 9/1965 United Kingdom.
1163617 9/1969 United Kingdom.

*Primary Examiner*—A. Lionel Clingman
*Attorney, Agent, or Firm*—Irving N. Feit; Irving M. Fishman

[57] ABSTRACT

Contact lenses comprising polymeric lens materials in which reactive dyestuffs have been covalently bonded to monomer units of the polymer backbone, said reactive dyestuffs being reactive dyes capable of forming ether linkages with cellulose and reactive with hydroxyl, amino, amido or mercapto groups present in a hydrogel polymer to form the covalent bond therewith. The invention is of particular interest in the area of so-called hydrophilic or "soft" contact lenses, commonly referred to as hydrogel lenses.

13 Claims, No Drawings

TINTED CONTACT LENSES AND A METHOD FOR THEIR PREPARATION

This specification is a continuation of application Ser. No. 580,398 filed Feb. 15, 1984, which is a continuation-in-part of application Ser. No. 382,973 filed June 1, 1982, now U.S. Pat. No. 4,468,229 which is a continuation-in-part of application Ser. No. 292,325 filed Aug. 12, 1981, now abandoned.

This invention relates to tinted contact lenses and to a method for their preparation.

In particular, the invention concerns contact lenses comprising polymeric lens materials in which reactive dyestuffs have been covalently bonded to monomer units of the polymer backbone. The invention is of particular interest in the area of so-called hydrophilic or "soft" contact lenses, commonly referred to as hydrogel lenses.

Many of the known methods for tinting or coloring plastic materials are unsuitable for practical coloring of contact lenses, in particular of hydrophilic contact lenses. For example, those methods whereby a coloring agent is dispersed in a plastic by dissolving or dispersing a dye or pigment in a monomer precursor or in the polymer matrix cannot be used to obtain satisfactory water-absorbable materials. This is because water induces a migration of the coloring agent within the plastic material and a leaching of the colorant outside of it. This migration, moreover, can be acelerated during heat sterilization treatments as commonly used with hydrophilic lenses, since the heating process in most cases expands the polymer matrix. Therefore, the most common method for preparation of hard contact lenses, in which the lens blanks are tinted or colored, would not be feasible for the preparation of soft lenses.

One alternative approach for coloring plastic materials is the use of printing, transfer or coating methods. According to this process, a coloring agent is caused to adhere to the surface of the plastic. This method is also unsuitable for coloring water-absorbable plastics, such as are used for the preparation of hydrophilic contact lenses. If a plastic material colored by this method is allowed to swell in water, the applied layer of coloring agent does not swell as much as the plastic itself. Consequently, the coloring agent will become dissociated from the surface of the plastic. In any event, a simple transfer coloring method does not obviate the problem of leaching and will always be limited by the degree of physical adhesion of coloring agent to the surface.

A number of methods have been disclosed in the literature whereby all or a portion of a soft contact lens is painted or printed using an implement such as a brush. For example, in *Contact Lens Forum*, volume 3, March 1978, pp. 13-17, a method is disclosed in which the surface of a lens is colored by a chemical printing process. This method, however, is not entirely satisfactory, as it is noted that the color tends to fade after several autoclavings.

The use of water-soluble dyes is also unsatisfactory for the preparation of, in particular, soft contact lenses. Water-soluble dyes will leach during repeated thermal sterilization treatments. Moreover, water-soluble dyes in long term contact with the eye might permanently stain the ocular tissue. Thus, the method disclosed in the *American Journal of Optometry and Physiological Optics*, Volume 54, pp. 160-164 (1977), "Methods of Tinting Soflens ® Contact Lenses," would not provide a solution to the problem of preparation of practical tinted soft contact lenses.

In addition to the problems engendered by the use of hydrophilic plastic material for the preparation of these lenses, there is an additional complication introduced by the dimensions of the lens itself. Conventional hard contact lenses, generally prepared from formulations using as principal co-monomer methyl methacrylate, are in general fitted with a diameter which is less than the diameter of the cornea of the eye. It is therefore possible to use a lens which is colored over its entire extent. In contrast, soft contact lenses are most commonly fitted with a diameter larger than that of the cornea. Because of this feature, a uniformly-colored soft contact lens would appear quite prominently against the white sclera of the eye. In order to prepare a natural appearing contact lens, it would therefore be necessary to have a colored central area and a clear outer perimeter.

As noted in U.S. Pat. No. 4,252,421, the preparation of such lenses leads to difficulties in fabrication. There must be no bleeding of color from the central portion into the outer, clear portion. Colored area and clear area should, moreover, be concentric and easily aligned during the preparation. Finally, it is essential that there be no leaching of color either into the tear fluid or into the sterilization solution.

U.S. Pat. No. 4,252,421 discloses a method for preparation of soft contact lenses containing a tinted central core and an outer lens element which is usually clear. The colored central core is formed from a tinted button, which in turn is polymerized from a monomer mixture which includes a dye as co-monomer. Thus, the water-insoluble dye or dyes are part of the backbone of the polymer. Alternatively, a water-insoluble dye may be added to the co-monomer mixture and this combination polymerized, whereby the dye is entrained in the polymer matrix. Due to the insolubility of the dye, it will not bleed or leach from the polymerized button. Two methods are also disclosed for fabricating the contact lens. The first method involves polymerizing the tinted button, placing the tinted button in a mold and pouring a hydrogel co-monomer mixture around the tinted button and polymerizing this mixture. An alternative method for forming the lens is to polymerize the clear outer button initially and then to form a centrally-positioned aperture through the button. The co-monomer mixture including the dye is then placed within the aperture and polymerized.

This method suffers from a number of substantial drawbacks. With respect to the method in which a water-insoluble dye is merely entrained in the polymer matrix, the difficulties enumerated above will be present. In contrast to the uniform composition of a conventional hydrophilic contact lens, the lenses produced according to U.S. Pat. No. 4,252,421 are a combination of hard lens and soft or hydrogel lens materials. Moreover, the preparation of these lenses requires a number of separate fabrication and polymerization steps. In addition, lenses of this type must be specially prepared for each prescription. Therefore, a substantial inventory must be carried by the dispenser of contact lenses in order to cover the range of prescriptions and colors normally desired. Finally, the use of combination hard-soft lenses would generally lead to a wrinkling or crimping of the edge upon hydration, causing discomfort to the wearer.

U.S. Pat. No. 4,157,892 discloses a method for coloring water-absorbable plastic which comprises four steps. The first step is manufacture of a coupler monomer or coupler polymer. A polymerization radical is introduced into a coupler agent to obtain a polymerizable coupler monomer, from which a coupler polymer may be manufactured. Either of the couplers obtained in the first step is then copolymerized or polymerized with a water-absorbable plastic in the form of a monomer or a polymer in the presence of a polymerization initiator to produce a water-absorbable plastic capable of developing color. The material thus prepared is formed into an intermediate product having the same dimensions as those of the desired final product, such as a water-absorbable contact lens. Finally, the intermediate product is colored by immersion of the lens in an aqueous solution of a diazonium double salt which acts as a developer. The immersion is continued for a length of time required to cause the swelling of the intermediate product, thereby allowing the diazo-component to penetrate into the plastic. Then, the solution is controlled to optimum pH value for causing a coupling reaction to take place and to allow the azoic dye to develop its color on the final product. The production of partially-colored intermediate products is possible through the application of ultraviolet radiation to those portions of the plastic which are not to be colored, whereby the diazo-components on those portions are broken down.

This method again has the disadvantage of being procedurally quite complicated. The procedure for preparation of the material in which the color is later to be developed must be carried out in a series of discrete steps, and care must be taken that that is no premature development of the azoic dye in the lens material. Moreover, the azoic dye precursor is dispersed throughout the lens material, which could lead to differences in color intensity dependent upon the thickness of the lens material. In order to provide colored lenses for a wide variety of prescriptions, it would again be necessary for the dispenser to keep a large inventory. In addition, it is clear that this method is only suitable for use with specially-prepared lens material, including a coupler. Therefore, it would not be feasible to use the method taught in U.S. Pat. No. 4,157,892 with conventional hydrophilic lens materials currently in use. Finally, the use of couplers of the type described in this reference would be likely to lead to polymeric materials of inferior quality, compared to materials now in use for this purpose.

It is therefore a goal of the present invention to avoid the problems associated with the prior art methods. In particular, it is an object of the instant invention to provide a method of tinting or coloring contact lenses which can be carried out without the need for complicated procedures and specialized equipment. It is an additional object of the instant invention to provide a method of coloring lenses which can be kept in inventory in an untinted state, or which are already available on the market and/or have been prescribed to the patient.

Further objects of the invention include the development of a method for preparing a contact lens which appears completely natural as worn on the eye, i.e., lenses having a central colored portion covering the cornea and clear edges over the part of the lens covering the sclera. It is additionally an object of the invention to provide contact lenses which will retain the color over long periods of time and repeated chemical and/or heat sterilization treatments. It is a further object of the invention to prepare contact lenses in a wide range of colors and color combinations through mechanically simple procedures.

These and other object can be achieved according to the invention, wherein contact lenses are disclosed comprising polymeric lens materials in which exoskeletal covalent bonds are formed between reactive dyestuffs and monomer units of the polymer backbone. In particular, the invention is directed to contact lenses prepared from hydrophilic polymeric materials such as used for preparation of so-called "soft" contact lenses.

A wide variety of polymers are suitable for use in the preparation of the novel lenses. The only requirement is that the monomers contain a at least one functional group capable of reacting with a reactive dyestuff, either before or after polymerization of the monomers to form the polymer. Examples of such functional groups commonly present in contact lens materials are the hydroxyl, amino, amide and thio groups, and functional derivatives thereof. In addition, a reactive dyestuff can react with a suitable exoskeletal unsaturation in the polymeric material or in the unreacted monomer.

The composition of the lens material itself can vary within wide limits, the only requirement being the presence in the monomer mixture of at least one component which will provide the polymer with the required exoskeletal functional groups. Particularly suitable as monomers for this purpose are hydroxyalkyl esters of polymerizable unsaturated acids, such as acrylic, methacrylic, itaconic, fumaric and maleic acids. Among such esters, hydroxyethyl methacrylate (HEMA) has been used quite extensively; lenses prepared from such materials are disclosed, for example, in U.S. Pat. Nos. 2,976,576 and Re 27,401.

The inventive method can also be used to color hard contact lenses prepared from materials which contain at least one monomer providing the required functional group. A primary example of such a monomer is cellulose acetate butyrate (CAB), currently in use for hard contact lenses.

In general, however, any polymeric material suitable for use in the preparation of a contact lens can also be used for the preparation of the inventive tinted lenses, with the proviso that at least one of the monomeric components which forms the material contains the exoskeletal functional group which can react with the reactive dyestuff molecule. Therefore, the instant invention can be employed with a wide variety of known polymeric lens materials. This allows for the possibility of preparing tinted contact lenses according to the invention from the wide range of materials already available, as well as novel contact lens materials yet to be developed or marketed.

In addition to hydroxyalkyl esters of unsaturated acids, the following monomeric materials may serve as typical examples of co-monomers which can be used in conjunction with monomers providing the required functional groups: acrylic and methacrylic acids; alkyl and cycloalkyl acrylates and methacrylates; N-(1,1-dimethyl-3-oxobutyl) acrylamide; and heterocyclic N-vinyl compounds containing a carbonyl functionality adjacent to the nitrogen in the ring, in particular N-vinyl lactams such as N-vinyl pyrrolidone. Moreover, one or more cross-linking agents may be used, as known in the art, in order to provide a polymeric material of optimal properties. Examples of such cross-linking agents include trimethylolpropane trimethacrylate, ethylene glycol dimethacrylate (EDMA) and diethylene glycol bis-allyl carbonate.

Useful reactive dyes according to the instant invention are commonly referred to as "reactive dyes forming ether linkages" inasmuch as the reactive group or groups in this known class of dyes react with cellulose to form an ether linkage, as opposed to, for example, an ester linkage. Such reactive dyes forming ether linkages are generally described in *FIBRE-REACTIVE DYES* Chapter VI, by W. F. Beech, SAF International Inc., New York (1970), incorporated herein by reference.

This class of reactive dyes, known as reactive dyes forming ether linkages, are believed to react with hydroxyl, amino, amido or mercapto groups present in the hydrogel polymer network of contact lens materials primarily by nucleophilic addition to form a covalent bond therewith.

A wide variety of commercially available dyes, reactive via nucleophilic substitution, are suitable for use in the preparation of the inventive contact lenses. In addition, virtually any desired shade or tint can be achieved through the use of a particular reactive dye or combination of reactive dyes.

Thus, dyes containing an activated double bond which is able to add to a functional group external to the polymer backbone can be used according to the invention. For example, exoskeletal bond activated by a bridge member such as an $-SO_2-$, $-SO-$ or $-CO-$ group are particularly suitable for use according to the invention. Similarly, dyes with functional groups which can undergo addition reactions with exoskeletal double bonds of the polymer may be employed.

Among the types of reactive dyes suitable for use according to the invention, the following general classes may be mentioned: reactive dyes containing vinyl sulfone precursors, such as $\beta$-sulfatoethylsulfonyl, $\beta$-sulfatoethylsulfonamido, $\beta$-hydroxyethylsulfonyl and $\beta$-hydroxyethylsulfonamido substituents, as well as suitable derivates thereof; dyes containing acryloylamino, $\beta$-chloropropionylamino, and $\beta$-sulfatopropionyl-amino and related reactive groups; dyes containing $\beta$-phenylsulfonylpropionylamino groups; dyes containing $\beta$-sulfato- or $\beta$-chloroetylsulfamoyl groups; chloroacetyl dyes; $\alpha$-bromocryloyl dyestuffs; and a wide variety of other reactive dyes which have or are being developed for use in the dyeing of natural and synthetic fibers, in particular of cellulose and wool and function by nucleophilic addition. Although there are many examples in the art of the use of reactive dyestuffs with clothfiber materials, the application of these dyes to the preparation of tinted contact lenses has not been disclosed until this time.

Some typical examples of commercially available dyes suitable for use according to the invention are listed below:

| Structure | Commercial Brand Name | Firm | Year of Introduction |
|---|---|---|---|
| Dye-SO$_2$—CH$_2$—CH$_2$—O—SO$_3$Na | Remazol | Hoechst | 1958 |
| Dye-SO$_2$NHCH$_2$CH$_2$OSO$_3$Na | Levafix | Bayer | 1958 |
| Dye-NH—OC—CH$_2$CH$_2$SO$_2$C$_6$H$_5$ | Solidazol | Cassella | 1964 |
| Dye-NH—OC—CH=CH$_2$Br | | | |
| Dye-NH—OC—C(Br)=CH$_2$ | Lanasol | CIBA | 1966 |
| Dye-NHCH$_2$OH | Calcobond | American Cyanamid | 1966 |

Some specific examples of these dyes, taken from the Color Index, Volume 5, Third Edition (Second Revision, 1982) include:

| Commercial Name | | C.I. Generic Name | C.I. Construction Number |
|---|---|---|---|
| REMAZOL | | | |
| Black B | HOE, HST | C.I. Reactive Black 5 | 20505 |
| Black RL | HOE | C.I. Reactive Black 31 | |
| Blue BR | HOE | C.I. Reactive Blue 158 | |
| Blue 3R | HOE | C.I. Reactive Blue 28 | |
| Bordeaux B | HOE | C.I. Reactive Red 49 | |
| Brilliant Blue B | HOE | C.I. Reactive Blue 27 | |
| Brilliant Blue R | HOE, HST | C.I. Reactive Blue 19 | 61200 |
| Brilliant Green 6B | HOE | C.I. Reactive Blue 38 | |
| Brilliant Green GGL | HOE | C.I. Reactive Green 14 | |
| Brilliant Orange GD | HOE | C.I. Reactive Orange 15 | |
| Brilliant Orange FR | HOE | C.I. Reactive Orange 82 | |
| Brilliant Orange 3R | HOE | C.I. Reactive Orange 16 | 17757 |
| Brilliant Orange RR | HOE | C.I. Reactive Orange 7 | 17756 |
| Brilliant Red 5B | HOE | C.I. Reactive Red 35 | |
| Brilliant Red 6B | HOE | C.I. Reactive Red 174 | |
| Brilliant Red BB | HOE, HST | C.I. Reactive Red 21 | |
| Brilliant Red F3B | HOE | C.I. Reactive Red 180 | |
| Brilliant Red GD | HOE | C.I. Reactive Red 63 | |
| Brilliant Red GG | HOE | C.I. Reactive Red 106 | |
| Brilliant Violet 4R | HOE | C.I. Reactive Violet 27 | |
| Brilliant Violet 5R | HOE, HST | C.I. Reactive Violet 5 | 18097 |
| Brilliant Yellow GL | HOE | C.I. Reactive Yellow 37 | |
| Brilliant Yellow 7GL | HOE | C.I. Reactive Yellow 57 | |

-continued

| Commercial Name | | C.I. Generic Name | C.I. Construction Number |
|---|---|---|---|
| Brown 3G | HOE | C.I. Reactive Brown 16 | |
| Brown GR | HOE | C.I. Reactive Brown 18 | |
| Dark Blue HR | HOE | C.I. Reactive Blue 89 | |
| Golden Orange 3G | HOE | C.I. Reactive Orange 78 | |
| Golden Orange 4G | HOE | C.I. Reactive Orange 74 | |
| Golden Yellow G | HOE, HST | C.I. Reactive Yellow 17 | 18852 |
| Navy Blue RD | HST | C.I. Reactive Blue 20 | |
| Printing Black G | HOE | C.I. Reactive Black 14 | |
| Printing Navy Blue 3G | HOE | C.I. Reactive Blue 98 | |
| Printing Navy Blue 3GH | HOE | C.I. Reactive Blue 98 | |
| Printing Navy Blue RN | HOE | C.I. Reactive Blue 121 | |
| Printing Navy Blue RR | HOE | C.I. Reactive Blue 122 | |
| Printing Rhodamine BB | HOE | C.I. Reactive Red 133 | |
| Printing Rhodamine BG | HOE | C.I. Reactive Red 167 | |
| Printing Yellow 5G | CFM | C.I. Reactive Yellow 97 | |
| Red B | HOE | C.I. Reactive Red 22 | 14824 |
| Red 3B | HOE | C.I. Reactive Red 23 | 16202 |
| Red BBT | FH | C.I. Reactive Red 103 | |
| Red Violet R | HOE, HST | C.I. Reactive Violet 4 | 18096 |
| Rubine GR | HOE | C.I. Reactive Red 170 | |
| Turquoise FC3A | HST | C.I. Reactive Blue 91 | |
| Turquoise Blue B | HOE | C.I. Reactive Blue 77 | |
| Turquoise Blue G | HOE | C.I. Reactive Blue 21 | |
| Yellow FG | HOE | C.I. Reactive Yellow 42 | |
| Yellow FHG | HOE | C.I. Reactive Yellow 42:1 | |
| Yellow G | HST | C.I. Reactive Yellow 14 | 19036 |
| Yellow GGR | HOE | C.I. Reactive Yellow 96 | |
| Yellow GNL | HOE | C.I. Reactive Yellow 23 | |
| Yellow GR | HOE, HST | C.I. Reactive Yellow 15 | |
| Yellow RT | HST | C.I. Reactive Yellow 16 | |
| Yellow RTN | HOE | C.I. Reactive Yellow 24 | |
| Yellow Brown G | HOE | C.I. Reactive Brown 30 | |
| LEVAFIX | | | |
| Black E-B | BAY | C.I. Reactive Black 5 | 20505 |
| Black E-2G | BAY | C.I. Reactive Black 26 | |
| Black E-RL | FBy | C.I. Reactive Black 17 | |
| Black GL | FBy | C.I. Reactive Black 7 | |
| Black P-G | BAY | C.I. Reactive Black 26 | |
| Black P-3GA | BAY | C.I. Reactive Black 34 | |
| Black PN-L | BAY | C.I. Reactive Black 42 | |
| Black P-R | BAY | C.I. Reactive Black 21 | |
| Blue E-FBA | BAY | C.I. Reactive Blue 170 | |
| Blue E-3GLA | BAY | C.I. Reactive Blue 113 | |
| Blue E-3R | BAY | C.I. Reactive Blue 51 | |
| Blue P-3GLA | BAY | C.I. Reactive Blue 113 | |
| Blue P-RA | BAY | C.I. Reactive Blue 104 | |
| Blue P-3RL | BAY | C.I. Reactive Blue 65 | |
| Blue Green B | FBy | C.I. Reactive Green 1 | |
| Brilliant Blue E-B | BAY, MBY | C.I. Reactive Blue 29 | |
| Brilliant Blue EB | ByDB | C.I. Reactive Blue 29 | |
| Brilliant Blue E-BRA | BAY | C.I. Reactive Blue 114 | |
| Brilliant Blue E-FFA | BAY | C.I. Reactive Blue 181 | |
| Brilliant Blue E-FR | BAY | C.I. Reactive Blue 68 | |
| Brilliant Blue E-2GLA | BAY | C.I. Reactive Blue 178 | |
| Brilliant Blue E-R | FBy | C.I. Reactive Blue 44 | |
| Brilliant Blue 14G | BAY | C.I. Reactive Blue 23 | |
| Brilliant Blue P-3RA | BAY | C.I. Reactive Blue 166 | |
| Brilliant Blue P-RL | BAY | C.I. Reactive Blue 66 | |
| Brilliant Blue P-RLA | BAY | C.I. Reactive Blue 142 | |
| Brilliant Blue PN-L | BAY | C.I. Reactive Blue 185 | |
| Brilliant Blue RR | FBy | C.I. Reactive Blue 12 | |
| Brilliant Blue RRN | FBy | C.I. Reactive Blue 24 | |
| Brilliant Green E-5BA | BAY | C.I. Reactive Green 21 | |
| Brilliant Green 3GL | FBy | C.I. Reactive Green 9 | |
| Brilliant Green 1B | FBy | C.I. Reactive Green 2 | |
| Brilliant Orange E-G | BAY | C.I. Reactive Orange 63 | |
| Brilliant Orange E-2G | FBy | C.I. Reactive Orange 47 | |
| Brilliant Orange P-GR | BAY | C.I. Reactive Orange 41 | |
| Brilliant Red E-2B | BAY, MBY | C.I. Reactive Red 41 | |
| Brilliant Red E2B | ByDB | C.I. Reactive Red 41 | |
| Brilliant Red E-4B | BAY, FNC, MBY | C.I. Reactive Red 40 | |
| Brilliant Red E4B | ByDB | C.I. Reactive Red 40 | |
| Brilliant Red E-7B | BAY | C.I. Reactive Red 87 | |
| Brilliant Red E-BA | BAY | C.I. Reactive Red 124 | |
| Brilliant Red E-3BA | BAY | C.I. Reactive Red 147 | |
| Brilliant Red E-4BA | BAY | C.I. Reactive Red 158 | |
| Brilliant Red E4BA | ByDB | C.I. Reactive Red 158 | |
| Brilliant Red E-G | BAY | C.I. Reactive Red 67 | |
| Brilliant Red P-B | BAY | C.I. Reactive Red 80 | |
| Brilliant Red P-3B | BAY | C.I. Reactive Red 81 | |

-continued

| Commercial Name | | C.I. Generic Name | C.I. Construction Number |
|---|---|---|---|
| Brilliant Red P-5B | BAY | C.I. Reactive Red 82 | |
| Brilliant Scarlet E-5B | FBy | C.I. Reactive Red 38 | |
| Brilliant Scarlet E-4G | BAY | C.I. Reactive Red 117 | |
| Brilliant Yellow E-3G | BAY, FNC, MBY | C.I. Reactive Yellow 25 | |
| Brilliant Yellow E3G | ByDB | C.I. Reactive Yellow 25 | |
| Brilliant Yellow E-GA | BAY | C.I. Reactive Yellow 111 | |
| Brilliant Yellow E-2GA | BAY | C.I. Reactive Yellow 106 | |
| Brilliant Yellow P-G | BAY | C.I. Reactive Yellow 63 | |
| Brilliant Yellow P-3G | BAY | C.I. Reactive Yellow 49 | |
| Brilliant Yellow P-3GA | BAY | C.I. Reactive Yellow 25 | |
| Brown E-2R | BAY | C.I. Reactive Brown 19 | |
| Brown E2R | ByDB | C.I. Reactive Brown 19 | |
| Brown 13R | BAY | C.I. Reactive Brown 3 | |
| Brown P-3GA | BAY | C.I. Reactive Orange 71 | |
| Brown 5RL | BAY | C.I. Reactive Brown 4 | |
| Dark Blue E-2GA | BAY | C.I. Reactive Blue 167 | |
| Dark Blue FG | BAY | C.I. Reactive Blue 34 | 20505 |
| Dark Brown P-BRA | BAY | C.I. Reactive Brown 24 | |
| Dark Green E-3BLA | BAY | C.I. Reactive Green 16 | |
| Golden Yellow E-3GA | BAY | C.I. Reactive Orange 67 | |
| Golden Yellow E-G | BAY, FNC, MBY | C.I. Reactive Yellow 27 | |
| Golden Yellow EG | ByDB | C.I. Reactive Yellow 27 | |
| Golden Yellow E-GRA | BAY | C.I. Reactive Yellow 125 | |
| Golden Yellow IR | FBy | C.I. Reactive Yellow 9 | |
| Golden Yellow P-G | FBy | C.I. Reactive Orange 61 | |
| Golden Yellow P-GGA | BAY | C.I. Reactive Yellow 87 | |
| Golden Yellow P-R | BAY | C.I. Reactive Orange 42 | |
| Green E-FB | FBy | C.I. Reactive Green 17 | |
| Green E-FBA | FBy | C.I. Reactive Green 20 | |
| Gray IG | FBy | C.I. Reactive Black 2 | 59880 |
| Navy Blue E-2R | BAY | C.I. Reactive Blue 73 | |
| Navy Blue E-RA | BAY | C.I. Reactive Blue 120 | |
| Navy Blue E-4RA | BAY | C.I. Reactive Violet 23 | |
| Navy Blue P-RA | BAY | C.I. Reactive Blue 120 | |
| Navy Blue P-4RA | BAY | C.I. Reactive Violet 23 | |
| Navy Blue P-RRL | BAY | C.I. Reactive Blue 67 | |
| Olive IT | FBy | C.I. Reactive Green 3 | |
| Orange E-3GA | BAY, FNC, MBY | C.I. Reactive Orange 64 | |
| Orange E3GA | ByDB | C.I. Reactive Orange 64 | |
| Orange E-5GA | BAY | C.I. Reactive Orange 69 | |
| Orange P-4GA | BAY | C.I. Reactive Orange 62 | |
| Red G | FBy | C.I. Reactive Red 27 | |
| Red P-GA | BAY | C.I. Reactive Red 119 | |
| Red Violet E-2BL | BAY | C.I. Reactive Violet 7 | |
| Red Violet E-4BLA | BAY | C.I. Reactive Violet 33 | |
| Rubine E-BA | BAY | C.I. Reactive Violet 29 | |
| Rubine E-FB | BAY | C.I. Reactive Red 37 | |
| Rubine P-FR | BAY | C.I. Reactive Violet 16 | |
| Scarlet E-2GA | BAY, MBY | C.I. Reactive Red 123 | |
| Scarlet E2GA | ByDB | C.I. Reactive Red 123 | |
| Scarlet P-RA | BAY | C.I. Reactive Red 153 | |
| Turquoise IGG | FBy | C.I. Reactive Green 4 | |
| Turquoise P-BBA | BAY | C.I. Reactive Blue 105 | |
| Turquoise P-G | FBY | C.I. Reactive Blue 95 | |
| Turquoise P-GA | BAY | C.I. Reactive Blue 138 | |
| Turquoise P-GNA | BAY | C.I. Reactive Blue 138 | |
| Turquoise Blue E-BA | BAY | C.I. Reactive Blue 116 | |
| Turquoise Blue E-G | BAY | C.I. Reactive Blue 21 | |
| Turquoise Blue E-4G | BAY | C.I. Reactive Blue 80 | |
| Violet P-4R | BAY | C.I. Reactive Violet 17 | |
| Yellow E-GR | BAY | C.I. Reactive Yellow 82 | |
| Yellow EGR | ByDB | C.I. Reactive Yellow 82 | |
| Yellow E-RL | BAY | C.I. Reactive Yellow 26 | |
| Yellow 4G | BAY | C.I. Reactive Yellow 10 | |
| Yellow 14G | FBy | C.I. Reactive Yellow 20 | |
| Yellow P-FGA | BAY | C.I. Reactive Yellow 42 | |
| Yellow P-GA | BAY | C.I. Reactive Yellow 83 | |
| Yellow P-GRL | BAY | C.I. Reactive Yellow 50 | |
| Yellow P-R | BAY | C.I. Reactive Yellow 54 | |
| SOLIDAZOL | | | |
| Black P-R | HOL | C.I. Reactive Black 21 | |
| Blue P-3R | CAS | C.I. Reactive Blue 165 | |
| Brilliant Blue FBR | CAS | C.I. Reactive Blue 53 | |
| Brilliant Pink BR | CFM | C.I. Reactive Red 70 | |
| Brilliant Pink RL | CFM | C.I. Reactive Red 69 | |
| Brilliant Rubin RR | CFM | C.I. Reactive Red 71 | |
| Golden Yellow GC | CAS | C.I. Reactive Orange 31 | |
| Green P-GG | CAS | C.I. Reactive Green 23 | |
| Navy Blue P-R | HOE | C.I. Reactive Blue 67 | |
| Orange G | CFM | C.I. Reactive Orange 32 | |

| Commercial Name | | C.I. Generic Name | C.I. Construction Number |
|---|---|---|---|
| Red P-B | HOE | C.I. Reactive Red 80 | |
| Red P-2B | CAS | C.I. Reactive Red 181 | |
| Red P-3B | HOE | C.I. Reactive Red 81 | |
| Red P-8B | HOE | C.I. Reactive Violet 16 | |
| Scarlet P-R | CAS | C.I. Reactive Red 176 | |
| Turquoise P-G | CAS | C.I. Reactive Blue 159 | |
| Yellow P-5G | CAS | C.I. Reactive Yellow 129 | |
| Yellow P-R | CAS | C.I. Reactive Yellow 130 | |
| LANASOL | | | |
| Blue G | CGY | C.I. Reactive Blue 177 | |
| Blue 3G | CGY | C.I. Reactive Blue 69 | |
| Blue 3R | CGY | C.I. Reactive Blue 50 | |
| Orange G | CGY | C.I. Reactive Orange 29 | |
| Orange R | CGY | C.I. Reactive Orange 68 | |
| Red B | CGY | C.I. Reactive Red 65 | |
| Red 5B | CGY | C.I. Reactive Red 66 | |
| Red G | CGY | C.I. Reactive Red 83 | |
| Red 2G | CGY | C.I. Reactive Red 116 | |
| Red 6G | CGY | C.I. Reactive Red 84 | |
| Scarlet G | CGY | C.I. Reactive Red 178 | |
| Scarlet 3G | CGY | C.I. Reactive Red 136 | |
| Scarlet 2R | CGY | C.I. Reactive Red 78 | |
| Violet 3B | CGY | C.I. Reactive Violet 34 | |
| Yellow 4G | CGY | C.I. Reactive Yellow 39 | |
| Yellow 6G | CGY | C.I. Reactive Yellow 126 | |
| Yellow 4R | CGY | C.I. Reactive Yellow 127 | |
| RHODAZOL | | | |
| Brilliant Orange YA | HST | C.I. Reactive Orange 50 | |
| Dark Blue 2BLA | HST | C.I. Reactive Blue 89 | |
| Dark Blue 3GLA | HST | C.I. Reactive Blue 90 | |
| Scarlet 3GA | HST | C.I. Reactive Red 94 | |

The preferred dyes include Remazol Yellow GR (Reactive Yellow 15, Registry Number CAS 60958-41-0); Remazol Turquoise P or RP (Reactive Blue 21, Registry Number CAS 73049-92-0) Remazol Black B (Reactive Black 5, Registry number CAS 17095-24-8); Remazol Golden Orange 3GA (Reactive Orange 78, Registry Number CAS 68189-39-9); and Rhodazol Brilliant Blue RW.

Another class of Dyes capable of forming tinted lenses in accordance with the present invention are fluorotriazine dyes. Such dyes react at lower temperatrues than the chlorotriazine dyes, which are not contemplated by the present invention.

Thus, fluorotriazine substituted dyes, wherein the fluorotriazine moiety is bonded directly, or through a divalent linking group, to the dyestuff nucleus, are reactive at a temperature below about 40° C., to form tinted or dyed contact lenses. Due in part to the high reactivity of such fluorotriazine dyes, the resulting lenses are not subjected to distortion and degradation effects which tend to occur at higher temperatures, and characteristically yield dyed or tinted lenses in which the triazinyl moiety is covalently bound to the contact lens substrate. Moreover, such dyes or tinted lenses are characterized by their level dyeings and tintings, exhibiting good alkaline and acid stability, as well as good stability to light.

Representative fluorotriazine containing dyes are those which are widely commercially available and include:
C.I. Reactive Yellow 143,
C.I. Reactive Yellow 139,
C.I. Reactive Orange 91,
C.I. Reactive Orange 95,
C.I. Reactive Red 183,
C.I. Reactive Red 184,
C.I. Reactive Blue 182,
C.I. Reactive Blue 183,
C.I. Reactive Blue 184, and
CIBACRON Blue F/GF.

Generally, dyes used in the invention have the formula

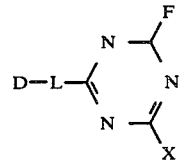

wherein D is an organic dyestuff radical, L is a bond or a divalent linking group, and X is an optional substituent. Typical structures are those of the analogus chlorotriazines (those compounds wherein the fluorine in the above formula is replaced with chlorine), many of which are specifically set forth in the Color Index under the heading of Reactive Dyes. While the structures in the Color Index do not limit the scope of the invention, they are exemplary of the D,L, and X groups suitable in the formula above.

Similarly, within the scope of the invention is the use of dyestuffs containing more than one reactive group capable of forming a covalent bond with hydroxyl, amino, amido or mercapto groups present in the hydroyl polymer network of contact lens materials by nucleophilic addition.

Preferred reactive dyestuffs capable of forming a covalent bond with the hydroxyl, amino, amido or mercapto groups present in the contact lens hydrogel material are those having the general formulae

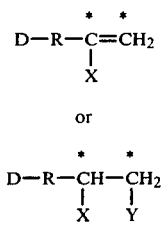

(I)

or (II)

wherein
- D is the radical of an organic dyestuff radical;
- R is a divalent organic electron attracting group capable of causing electron withdrawal of the C carbon atoms, thus activating the same;
- X is hydrogen or halo; and
- Y is a leaving group; or mixtures thereof.

The radical D may advantageously be the radical of an azo, phthalocyanine, azomethine, nitro or anthraquinone dye.

The divalent group —R— is advantageously bonded directly to an aromatic nuclear carbon of D, or is bonded thereto via an aliphatic group such as an alkylene group, e.g., a lower alkylene group. Most preferably, —R— is directly bonded to a nuclear carbon atom of D.

Suitable divalent R groups include —CO—, —SO$_2$—, —SO—, —NHCO—, —NHSO$_2$—, —SO$_2$NH— and the like. Most preferably, —R— is —SO$_2$—, —SO$_2$NH—, —CO— or —NHCO—.

When X is halo, it is most preferably chloro or bromo.

Suitable leaving groups, Y include —Cl, —Br, —OH, di-lower alkylamino,

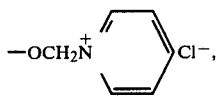

—SO$_2$-phenyl, —OSO$_3^-$Z$^+$ where Z is a cation, —OSO$_3$R$_1$ or —OSO$_2$R$_1$ where R$_1$ in each case is alkyl, aryl, aralkyl or alkaryl.

Advantageously where R$_1$, is alkyl, it is alkyl of 1 to 6 carbon atoms, preferably alkyl of 1 to 4 carbons, including for example, methyl, ethyl, isopropyl, butyl and the like. Where R$_1$ is aryl, it is preferably phenyl or naphthyl. Where R$_1$ is aralkyl, it is preferably lower alkyl substituted phenyl, such as tolyl or xylyl, and where R$_1$ is alkaryl, it is preferably lower alkylenephenyl, such as benzyl or phenethyl.

The reactive dyes of the class known as those forming ether linkages especially suitable for tinting hydrogel contact lens materials are those reactive dyes which form a covalent bond with the hydroxyl, amino, amido, or mercapto groups present in a hydrogel polymer network in an aqueous medium having a pH of 9 or greater and a temperature of up to about 60° C., preferably up to about 50° C., and most preferably up to about 40° C. Such reactive dyes, especially those of formula (I) or (II), are capable of dyeing hydrogel contact lenses without any significant degradation or deformation of the hydrogel substrate, due to the mild reaction conditions.

The invention provides novel tinted lenses with exceptional color fastness and color uniformity. According to the requirements in a particular instance, the dyestuff can be applied to both surfaces of a lens or to one surface only. In addition, the lens may be colored only in a particular portion or portions of the surface or surfaces. Thus, it is possible without difficulty to prepare lenses with, e.g., colored central portions and clear edges, or with an annular colored portion corresponding to the iris. The method can also be used, for example, for the application of identifying indicia on lenses, such as to indicate the concave or convex surface of a flexible lens.

In general, the formation of a covalent bond between the lens material and the reactive dyestuff is effected by a simple contacting of the dyestuff formulation, such as a mildly basic aqueous solution, with the lens material until reaction is complete. In a case where both surfaces of a lens are to be dyed, the lens is contacted on both surfaces with a formulation of the reactive dyestuff. The shade of color is controlled by the time of contacting with the dye formulation, as well as the reactivity of the dye with the surface of the lens. When it is desired to apply the dye to one surface only, or to a specific portion of the surface, the prepared lens may be placed on a fixture or in a mold, and the reactive dyestuff formulation applied only to a specific portion or portions of the lens surface. In view of the complicated methods generally employed in the art, this simple mechanical procedure for tinting contact lenses is an enormous advance over the known methods.

Moreover, where desired, deep, fast dyeings can be easily obtained, e.g. such that the lens has a light transmission of 90% or less in the desired visible color range, and substantially devoid of opacity, over the colored portion of the lens.

After the reaction of the lens material with the reactive dyestuff is effected, unreacted dyestuff may be removed using any suitable solvent. The choice of solvent for extraction or rinsing is, of course, dependent upon the solubility of the particular dyestuff. For the majority of dyestuffs in current use, lower alcohols such as methanol are suitable solvents. After the cleaning process, the tinted lens is freed of traces of the solvent, for example by boiling in distilled water.

For economic reasons, it is preferable to treat the already polymerized material with the dyestuff preparation. However, it would also be possible to treat a monomer such as HEMA with reactive dyestuff prior to polymerization, and subsequently to polymerize the reactive dyestuff—monomer units.

Because of the formation of a covalent bond between the polymeric material forming the contact lens and the reactive dyestuff, the lenses of the invention show a remarkable color fastness to all types of sterilization treatments commonly used for contact lenses, such as chemical, enzymatic and heat sterilizations. Moreover, since the coloring material is applied directly to the surface or surfaces of the lens, the shade is independent of lens thickness. This is in marked contrast to lenses prepared from plastic buttons in which pigment is entrained in the polymer matrix, since, in this case, the intensity of the shade is directly dependent upon the thickness of the lens. This is true, for example, with the contact lenses prepared according to U.S. Pat. No. 4,157,892.

Moreover, since the inventive method allows for the introduction of the coloring material at any time during the preparation of the colored lenses, it is possible to tint lenses after filling a particular prescription with conventional clear lenses. Thus, it is not necessary to keep a large inventory of precolored lenses, a substantial drawback of many of the known methods for preparing tinted lenses. After fitting conventional clear lenses, the color could be introduced as a final step before dispensing to the patient. Alternatively, previously prescribed lenses could be subsequently custom-tinted according to the desires of the wearer. Since the range of polymeric materials suitable for use according to the invention is sufficiently broad to embrace virtually all lens materials in current use, the inventive method is of an almost universal applicability.

Another advantage of the inventive method is the extreme reduction in cost of preparation of the inventive contact lenses, relative to known methods for preparation of lenses containing at least a central portion which has been colored. Suitable fiber-reactive dyes are readily available, and the ease of application of these dyes to the lens materials makes unnecessary the use of complicated polymerization procedures or equipment.

Tests on the oxygen permeability of lenses treated according to the invention have shown that there is virtually no change in oxygen permeability after treatment, as can be seen from the following table:

| Clear Lenses Oxygen Concentration*($P_L$) | Tinted Lens (Blue) Transmittance Oxygen Conc. ($P_L$) | |
|---|---|---|
| ($P_o$ = 6.10) | (at max. = 587 nm) | ($P_o$ = 6.10) |
| 1. 1.68 | 68.3% | 1.71 |
| 2. 1.47 | 23.0% | 1.50 |
| 3. 1.56 | 9.3% | 1.51 |
| 4. 1.66 | 0.0% | 1.60 |

*Tested under same technique as reported by M. F. Refojo, F. J. Holly and F. L. Leong, Contd. Intraocular Lens Med. J., 3(4) (1977) 27.

An additional advantage of the inventive lenses is the fact that most of the dyestuffs employed for tinting tend to absorb ultraviolet radiation, particularly of the wavelengths shown to be harmful to the eye, for example in *Optical Management*, "Ultraviolet Radiation and the Ocular Media," January 1981, pp. 21-33. In particular, it has been reported that ultraviolet radiation may be directly linked to the development of cataracts.

The invention may be better understood through the following examples:

EXAMPLE 1: TOTALLY BLUE ON BOTH SIDES OF TINTED LENS

A stock solution, stable for at least 5 weeks, is prepared by dissolving 0.1000 g of a dyestuff of the formula

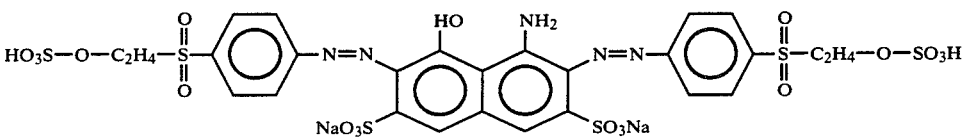

in 10 ml of 0.001 HCl solution. A clear HEMA lens is soaked in 1.0M sodium carbonate solution. The sodium carbonate soaked lens is then placed into 0.11 ml of the stock solution. 4 ml of 1.0M sodium carbonate solution is then added, and the lens allowed to remain in the solution for 53 minutes. The tinted lens is then neutralized with a buffered saline solution (pH=7.0). Then the tinted lens is extracted, with methanol as a solvent, in a solvent extraction apparatus, until there are no dye molecules leaching out. This may be readily determined, for example, by spectrophotometer. After the extraction process, the tinted lens is boiled in distilled water for one hour to get rid of any trace of methanol. Then the tinted lens is stored in a saline buffer solution.

The transmittance of the tinted lens at wavelength 600 nm is 68%.

EXAMPLE 2: TOTALLY AQUAMARINE ON BOTH SIDES OF TINTED LENS

A stock solution, stable for at least 3 weeks, is prepared by dissolving 0.1000 g of a dyestuff of the formula

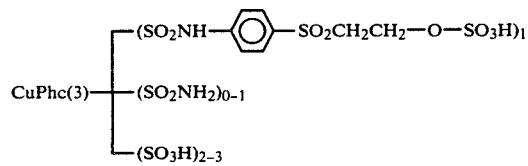

in 10 ml of 0.001M HCl solution. The lens which has been soaked in 1.0M sodium carbonate for 10 minutes, is placed into 1 ml of the stock solution. Thus 4 ml of 1.0M sodium carbonate solution is added, and the lens soaked for the desired time. The procedures of washing, extracting and rinsing of the lenses are the same as in Example 1.

The transmittance of the tinted lenses at wavelength 670 nm are 80% and 70% for two and four hour soakings, respectively.

EXAMPLE 3: TOTALLY BROWN ON BOTH SIDES OF TINTED LENS

Three stock solutions are required for this process, all of which are stable for at least six weeks.

(A) 0.0512 g of a dyestuff of the formula

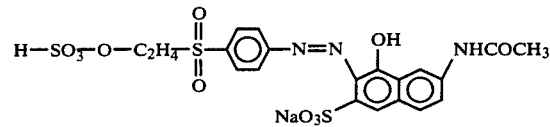

in 5 ml of 0.001M HCl solution.

(B) 0.0574 g of a dyestuff of the formula

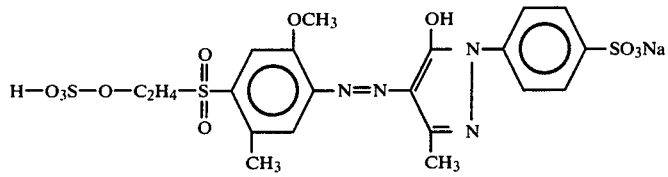

in 5 ml of 0.001M HCl solution (C) 0.0291 g of a dyestuff of the formula

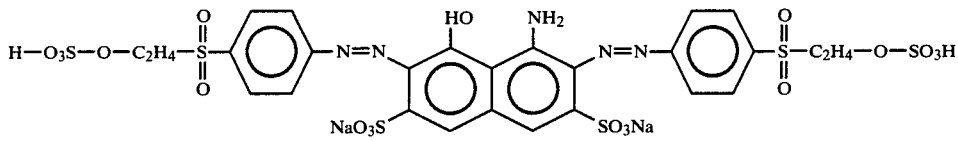

in 5 ml of 0.001M HCl solution

The lens, which has been soaked in 1.0M sodium carbonate solution for 10 minutes, is placed into 0.18 ml of A, 0.12 ml of B and 0.2 ml of C stock solutions. 1 ml of 1.0M sodium carbonate solution is then added for one hour and allowed to stand. The transmittance of the tinted lens at wavelengths 400, 490 and 605 nm are 45%, 51%, and 60% respectively.

EXAMPLE 4: TOTALLY GREEN ON BOTH SIDES OF TINTED LENS

The lens, which has been soaked in 1.0M sodium carbonate for 10 minutes, is placed into 0.18 ml of solution C and 0.12 ml of solution B prepared according to Example 2. Then 1 ml of 1.0M sodium carbonate solution is added, and the lens allowed to soak in the solution for 30 minutes. The transmittance of the tinted lens at wavelengths 580 and 385 nm are 64% and 58%, respectively.

EXAMPLE 5: EDGE CLEAR/ONE SIDE TINTED LENS

The tinting procedures are the same as for the Examples 1-4. The only difference is that the clear lens sits in a fixture. A suitable dye solution is then put into a mold, rather than immersing the lens in the dye solution. The area to be colored only is then brought into contact with the dye solution. The final steps of the procedure are the same is in Example 1.

Preparation of a fixture suitable for preparing the specific type of partially-tinted lens desired is a mechanically simple task. One type of fixture found useful for preparing clear-edge lenses may be described as follows:

The fixture has three interlocking pieces. The bottom piece is a dome upon which the lens is positioned. The curved surface of the dome has a diameter corresponding to that of the lens to be tinted. The top piece acts as a reservoir for the dye solution and has an elastic gasket. This gasket forms a seal on the surface of the lens at the edge of the area to be tinted. The third piece is a housing for the reservoir/gasket assembly. The entire fixture is then inserted in a clamp to hold the assembly firmly in place during the dyeing process.

The lens, which has been soaking in 1.0M sodium carbonate for 10 minutes, is placed in position on the dome. The reservoir portion of the fixture is positioned and clamped. The reservoir is filled with the desired concentration of dye and sodium carbonate solution. The solution is allowed to remain in contact with the lens until the desired shade is obtained. The reservoir is purged with water until all traces of the dye solution have been removed. The lens is then removed from the fixture.

Similarly good results may be obtained using, for example, dyestuffs of the following structures:

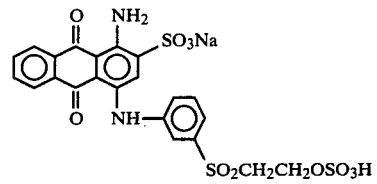

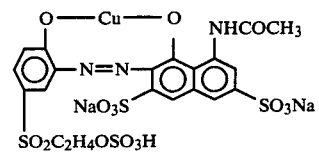

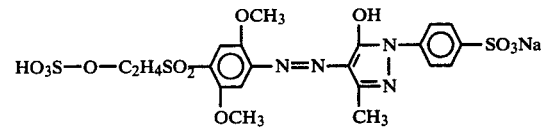

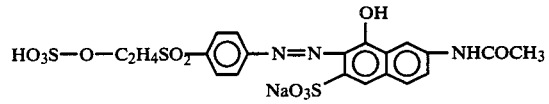

Many of these dyes are readily available on the market, and dyes of this type have been known in the art for many years. These examples should be viewed as illustrative only, without in any way limiting the scope of the instant invention.

What is claimed is:

1. A contact lens colored over at least a portion of its surface, comprising a copolymeric hydrogel material to which at least one reactive fluorotriazine dyestuff is covalently bonded external to the polymer backbone by reaction at temperatures up to 60° C. with hydroxyl, amino, amido or mercapto groups present in said polymer, over the colored portion of the lens.

2. A contact lens according to claim 1, wherein said reactive dyestuff is covalently bonded by nucleophilic addition to said hydroxyl, amino, amido or mercapto groups.

3. A contact lens according to claim 1, wherein said hydrogel material contains hydroxy groups in the polymer.

4. A contact lens according to claim 1 wherein the reactive fluorotriazine dyestuff is bonded to the polymer backbone by reaction at temperatures up to 50° C.

5. A contact lens according to claim 1, comprising a colored central portion and a clear annular edge.

6. A contact lens according to claim 1, wherein the colored portion thereof has a light transmission of 90% or less in a segment of the visible light range.

7. A process for preparing a contact lens colored over at least a portion of its surface, comprising reacting at temperatures up to 60° C. at least one ractive fluorotriazine dyestuff with hydroxyl, amino, amido or mercapto groups present in the polymeric hydrogel contact lens material, and removing unreacted dyestuff from said lens material.

8. The process according to claim 7 wherein the reactive fluorotriazine dyestuff and the polymeric hydrogel contact lens material is reacted at temperatures up to 50° C.

9. A process according to claim 7, wherein said lens material is in the form of a contact lens.

10. A process according to claim 9, wherein the reaction is conducted in an aqueous medium having a pH of at least 9 and at a temperature of up to 40° C.

11. A process according to claim 9, wherein the reactive dyestuff is applied to only a portion of said lens.

12. A process according to claim 7, wherein said dyestuff reacts by nucleophilic addition to said hydroxyl, amino, amido or mercapto groups in the hydrogel material.

13. A process according to claim 7, wherein said hydrogel material contains hydroxy groups in the polymer.

* * * * *